Aug. 5, 1958           H. BERG           2,846,280

PISTON RING FOR INTERNAL COMBUSTION ENGINES AND THE LIKE

Filed Oct. 19, 1954           2 Sheets-Sheet 1

HEINZ BERG
INVENTOR.

Aug. 5, 1958 H. BERG 2,846,280
PISTON RING FOR INTERNAL COMBUSTION ENGINES AND THE LIKE
Filed Oct. 19, 1954 2 Sheets-Sheet 2

HEINZ BERG
INVENTOR.

United States Patent Office 2,846,280
Patented Aug. 5, 1958

2,846,280

PISTON RING FOR INTERNAL COMBUSTION ENGINES AND THE LIKE

Heinz Berg, Frankfurt am Main, Germany, assignor to Alfred Teves, Maschinen- und Armaturenfabrik KG., Frankfurt am Main, Germany Application October 19, 1954, Serial No. 463,218

5 Claims. (Cl. 309—23)

This invention relates to piston rings such as they are used in combustion engines, high-pressure compressors, and the like.

Up to the present, cast iron has been mostly used for such piston rings. However, in spite of considerable improvements in design, structure and other characteristics of the piston rings, cast iron has certain limits in its usefulness.

Attempts have been made to compensate for disadvantages of cast iron by the use of lamellated steel. These rings, too, have certain disadvantages. The high speed combustion engine requires, for instance, a very lightweight ring for avoiding fluttering and higher gas passage as a consequence thereof.

It is the object of the present invention to overcome the drawbacks of existing piston rings and to provide a novel piston ring which is of a still lighter weight than the existing rings and combines with the light weight design a reduction in gas passage.

According to the present invention, a piston ring is devised which consists of one or more lamellated rings of cast iron or steel and one or several rings of plastics. By "lamellated ring" wherever the expression is used, it is intended to mean a thin, flat metal ring. Both kinds of rings may have any desired cross-section and they are used in superposed arrangement. The abutting open ends of the several rings may be in a staggered position so that upon contraction the ends of the rings will engage as in a lock.

At the abutting ends of the rings, the passage of combustion gases is largest, as is well known, since after assembly these ends will not lie so closely as to form a gas-tight fit and in some cases will not be in abutting relationship at all. By staggering the open ends of several rings, the effect may be reached that on the whole circumference at least one of the rings will lie against the cylinder wall in a tight fit, so that the gas will be prevented on the entire circumference from freely entering the crank case.

The size of the plastic and steel rings may be so chosen that either both, or only one of the types of rings used, will lie closely against the cylinder wall to make a tight fit. According to the invention, the ring of plastic may be used as oil scraper ring, since this ring has an appropriate shape. The plastic ring is arranged between lamelated steel rings, which preferably lie close against the grooved surfaces of the piston. In addition thereto, the rings of plastic material can be provided with openings which allow the stripped oil to pass through appropriate pores into the interior of the piston. The plastic ring may, according to the invention, consist of an unyielding material, or of one which has but a slight resilience. The resilience of the plastic insert may be enhanced according to the invention by suitable shaping, for instance by a stepped or corrugated shape or by, preferably staggered, recesses, slots, or the like.

The rings according to the invention may be loosely placed one above the other, or they may be cemented with suitable binders. In order to increase the heat conductivity, the plastic material may be intermixed with additives increasing heat conductivity.

Such additive may consist of a metal powder e. g. copper powder. However, any other heat conductive metal powder may be employed.

Any plastics known to have good heat resistance up to 180° C. as for example those on the polyamide basis may be employed.

The invention will now be explained more fully with reference to the accompanying drawings, but it should be understood that the illustrated embodiments are given by way of exemplification and not of limitation and that many changes may be made in the details without departing from the spirit of the invention.

All figures show parts of the rings in perspective.

Figure 1:
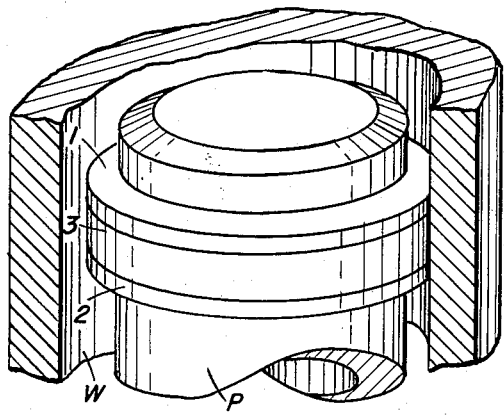
Fig. 1 shows a pair of lamellated steel rings, mounted on a piston within a cylinder.

Referring now to Fig. 1, a lamellated steel ring 1 and a second lamellated steel ring 2 are shown, which engage with the grooves of a piston P. Between the two steel rings, a ring 3 of plastic is arranged which has the same width, so that a tight fit with the cylinder wall W will be obtained. If desired, ring 3 may be narrower than the steel rings so that only the latter form a tight fit with the cylinder wall.

Figure 2:
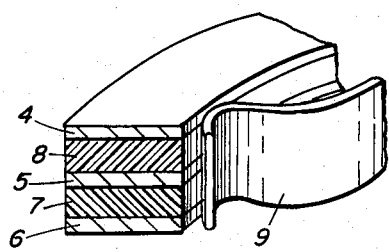
Fig. 2 shows a piston ring made up of three lamellated steel rings and two plastic rings.

In Fig. 2 a ring is illustrated which comprises three lamellated steel rings 4, 5, and 6 and two rings of plastics, 7 and 8. The latter may either be firmly united with the lamellated steel rings or loosely placed between them. An expansion spring 9 is provided for aiding in pressing the compound piston ring against the cylinder wall (not shown).

Figure 3:
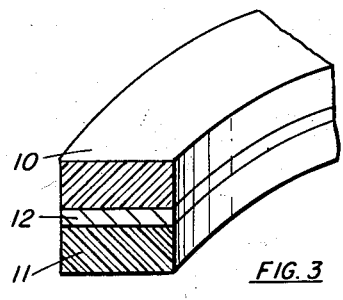
Fig. 3 shows a compound ring made of two rings of plastic and one steel ring.

Fig. 3 shows the embodiment in which two rings, 10 and 11, made of plastics, are combined with an interposed lamellated steel ring, 12.

Figure 4:
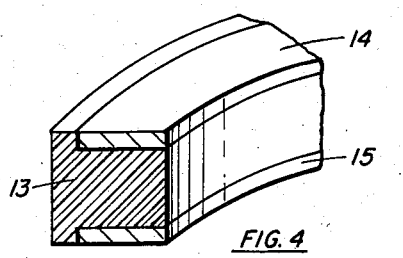
Fig. 4 shows another embodiment of a piston ring.

In Fig. 4 a piston ring is shown in which only the plastic ring 13 lies closely against the cylinder wall. At two other sides, which do not face this wall, the ring is fitted with recesses for taking up the lamellated steel rings 14 and 15.

Figure 5:
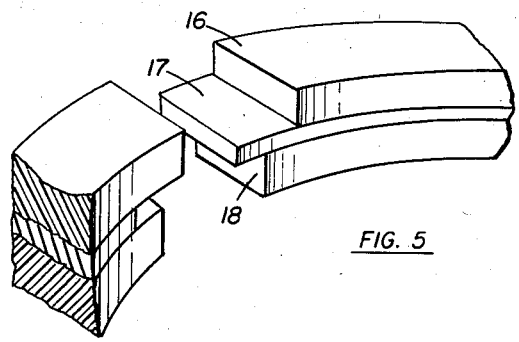
Fig. 5 illustrates a compound ring in which the abutting open ends are superposed in staggered relationship.

A piston ring, in which the abutting ends of the rings are arranged in staggered relationship, is shown in Fig. 5; two rings of plastics, 16 and 18, are shown with their open ends staggered in relationship to each other and to a steel ring 17.

Figure 6:
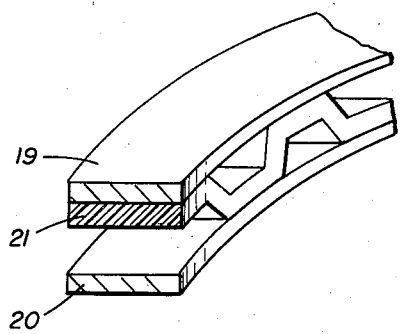
Fig. 6 shows another embodiment of a compound ring of steel and plastics.

Fig. 6 shows a steel ring 19 and a steel ring 20, and between the two a ring of plastics 21, which is in the shape of a corrugated member. Due to the corrugations, this ring is capable of an axial spring action and of compensating for differences in the groove dimensions of the piston wall.

Figure 7:
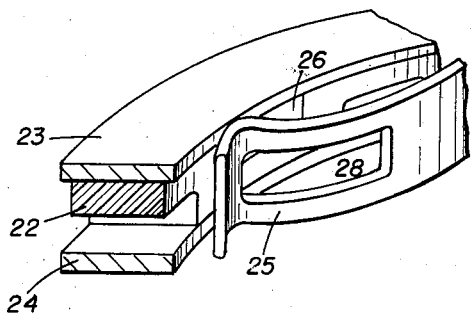
Fig. 7 shows a ring provided with oil passage holes.

A piston ring comprising two steel rings, 23 and 24, is shown in Fig. 7, wherein a plastic ring 22 is arranged between the two steel rings. Ring 22 has openings 26 for oil passage. Such a ring can be used as an oil scraper ring.

In this embodiment it is advantageous to make the ring of plastics narrower than the steel rings. An expansion spring 25 for pressing the piston ring may likewise be provided with an opening 28.

What I claim is:

1. A piston ring for combustion engines, compressors, and similar devices, having a plurality of superimposed lamellated steel and plastic rings alternatingly arranged with their open abutting ring ends in staggered relationship to one another, said ends being capable of locking engagement upon contraction.

2. A piston ring for combustion engines, compressors and similar devices, comprising a pair of lamellated steel rings, a plastic ring disposed between said steel rings, in contacting relationship with said steel rings, said plastic ring having holes for oil passage therethrough, said rings being superimposed on one another, said plastic ring forming the packing means between the piston and the wall of a cylinder in which said piston moves.

3. A piston ring for combustion engines, compressors and similar devices, comprising a pair of lamellated steel rings, a plastic ring disposed between said steel rings, in contacting relationship with said steel rings, said plastic ring having an additive incorporated therein for increasing heat conductivity, said rings being superimposed on one another, said plastic ring forming the packing means between the piston and the wall of a cylinder in which said piston moves.

4. A piston ring for combustion engines, compressors and similar devices, comprising a pair of lamellated steel rings, a plastic ring disposed between said steel rings, in contacting relationship with said steel rings, said plastic ring being of a material which is temperature-resistant up to 180° C., said rings being superimposed on one another, said plastic ring forming the packing means between the piston and the wall of a cylinder in which said piston moves.

5. A piston ring for combustion engines, compressors and similar devices, comprising a pair of lamellated steel rings, a plastic ring disposed between said steel rings, in contacting relationship therewith, said rings being superimposed on one another, and an expander spring having holes for oil passage, said rings being adapted to press the ring against the cylinder wall, said plastic ring forming the packing means between the piston and the wall of a cylinder in which said piston moves.

References Cited in the file of this patent

UNITED STATES PATENTS

| | | |
|---|---|---|
| 1,547,925 | Kibele | July 28, 1925 |
| 1,859,520 | Maisel | May 24, 1932 |
| 2,185,991 | Voorhies et al. | Jan. 2, 1940 |
| 2,399,550 | Klein | Apr. 30, 1946 |
| 2,446,224 | Frisby et al. | Aug. 3, 1948 |
| 2,456,529 | Naab | Dec. 14, 1948 |
| 2,462,257 | Cunningham | Feb. 22, 1949 |
| 2,557,835 | Monahan | June 19, 1951 |
| 2,626,193 | Patterson | Jan. 20, 1953 |

FOREIGN PATENTS

| | | |
|---|---|---|
| 551,507 | Great Britain | Feb. 25, 1943 |
| 906,350 | France | May 14, 1945 |